US 12,481,776 B2

United States Patent
Edward Hensley

(10) Patent No.: US 12,481,776 B2
(45) Date of Patent: Nov. 25, 2025

(54) CONTROLLED RELEASE OF INFORMATION IN DATA EXPORT

(71) Applicant: KYOCERA Document Solutions Inc., Osaka (JP)

(72) Inventor: Jonathan Edward Hensley, Vacaville, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 55 days.

(21) Appl. No.: 18/634,964

(22) Filed: Apr. 14, 2024

(65) Prior Publication Data

US 2025/0322090 A1    Oct. 16, 2025

(51) Int. Cl.
*G06F 21/00* (2013.01)
*G06F 21/60* (2013.01)
*G06F 21/62* (2013.01)

(52) U.S. Cl.
CPC ........ *G06F 21/6218* (2013.01); *G06F 21/602* (2013.01); *G06F 21/6209* (2013.01); *G06F 21/6227* (2013.01); *H04L 2209/04* (2013.01)

(58) Field of Classification Search
None
See application file for complete search history.

(56) References Cited

U.S. PATENT DOCUMENTS

| | | | |
|---|---|---|---|
| 9,847,879 B2 * | 12/2017 | Chabanne | H04L 9/30 |
| 12,182,179 B1 * | 12/2024 | Aravamudan | G06F 40/20 |
| 2021/0012883 A1 * | 1/2021 | Bidulock | G16H 30/20 |
| 2025/0174320 A1 * | 5/2025 | Renne | G16H 10/60 |

\* cited by examiner

*Primary Examiner* — Andrew J Steinle
(74) *Attorney, Agent, or Firm* — W. Eric Webostad

(57) ABSTRACT

Apparatuses and methods relate generally to controlled release of information. In a method, data of a data store in a network is exported in a format having unmasked, masked and encrypted portions and outside of a security protocol of the network. The data is provided as a localized volume for access via an application executing on a device for reading outside of the security protocol. The data has the masked and encrypted portions for a protected state. The data is searched with a search vector via the application. The application is configured for localized access of the data in the localized volume. Multiple records are found in the data responsive to the search vector. A target record of the multiple records is selected responsive to one or more of the unmasked portions of the data mixed in with the masked portions and the encrypted portions of the multiple records.

20 Claims, 9 Drawing Sheets

CONTROLLED RELEASE OF INFORMATION IN DATA EXPORT

FIELD

The following description relates to data. More particularly, the following description relates to controlled release of information in data export.

BACKGROUND

More recent data management systems often export data for reporting and migration purposes. This data can be stored in databases, text files, or other file formats. Some of this data can include sensitive information, such as dates of birth, social security numbers, bank account or credit card numbers, phone numbers, and other personally identifiable information. Moreover, artificial intelligence systems are reading massive amounts of information accessible via public networks and then an application of such systems may respond to a user request regarding a small portion of such information. Accordingly, it would be desirable and useful to provide protection for sensitive information while allowing release of some information of a lower sensitivity level.

SUMMARY

In accordance with one or more below described examples, a method relating generally to controlled release of information is disclosed. In such a method, data of a data store in a network is exported in a format having unmasked portions, masked portions and encrypted portions of the data. The data is exported as a localized volume outside of a security protocol of the network associated with restricted access of the data. The data is provided as the localized volume for access via an application executing on a standalone device or a networked device for reading thereof outside of the security protocol by one or more users. The data has the masked portions and the encrypted portions for a protected state of the information to limit access. The application is configured for localized access of the data in the localized volume. The data is searched with a search vector via the application. Multiple records found in the data responsive to the search vector are obtained. A target record of the multiple records is selected responsive to one or more of the unmasked portions of the data mixed in with the masked portions and the encrypted portions of the multiple records.

In accordance with one or more below described examples, a system relating generally to controlled release of information is disclosed. In such a system, a data handling system has a system memory, a data store, one or more processor units, and a communication interface. The system memory is configured to store program code including data services. The communication interface is coupled for receiving user requests for the data services. In response to executing the program code, the data handling system is configured to initiate operations for implementing a process for controlled release of information. The process includes: exporting data of the data store in a network in a format having unmasked portions, masked portions and encrypted portions of the data. The data is exported as a localized volume outside of a security protocol of the network associated with restricted access of the data. The data is provided as the localized volume for access by an application executing on a standalone device or a networked device for reading thereof outside of the security protocol by one or more users. The data has the masked portions and the encrypted portions for a protected state of the information to limit access. The data is searched with a search vector by the application. Multiple records found in the data responsive to the search vector are obtained. A target record of the multiple records is selected responsive to one or more of the unmasked portions of the data mixed in with the masked portions and the encrypted portions of the multiple records.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 through 2-3 is a pictorial-flow diagram depicting an example of a data handling system in communication with localized servers for serving user devices.

FIGS. 3-1 through 3-3 are respective table diagrams depicting an example of multiple records of data at various levels of security access.

DETAILED DESCRIPTION

Figure 1:
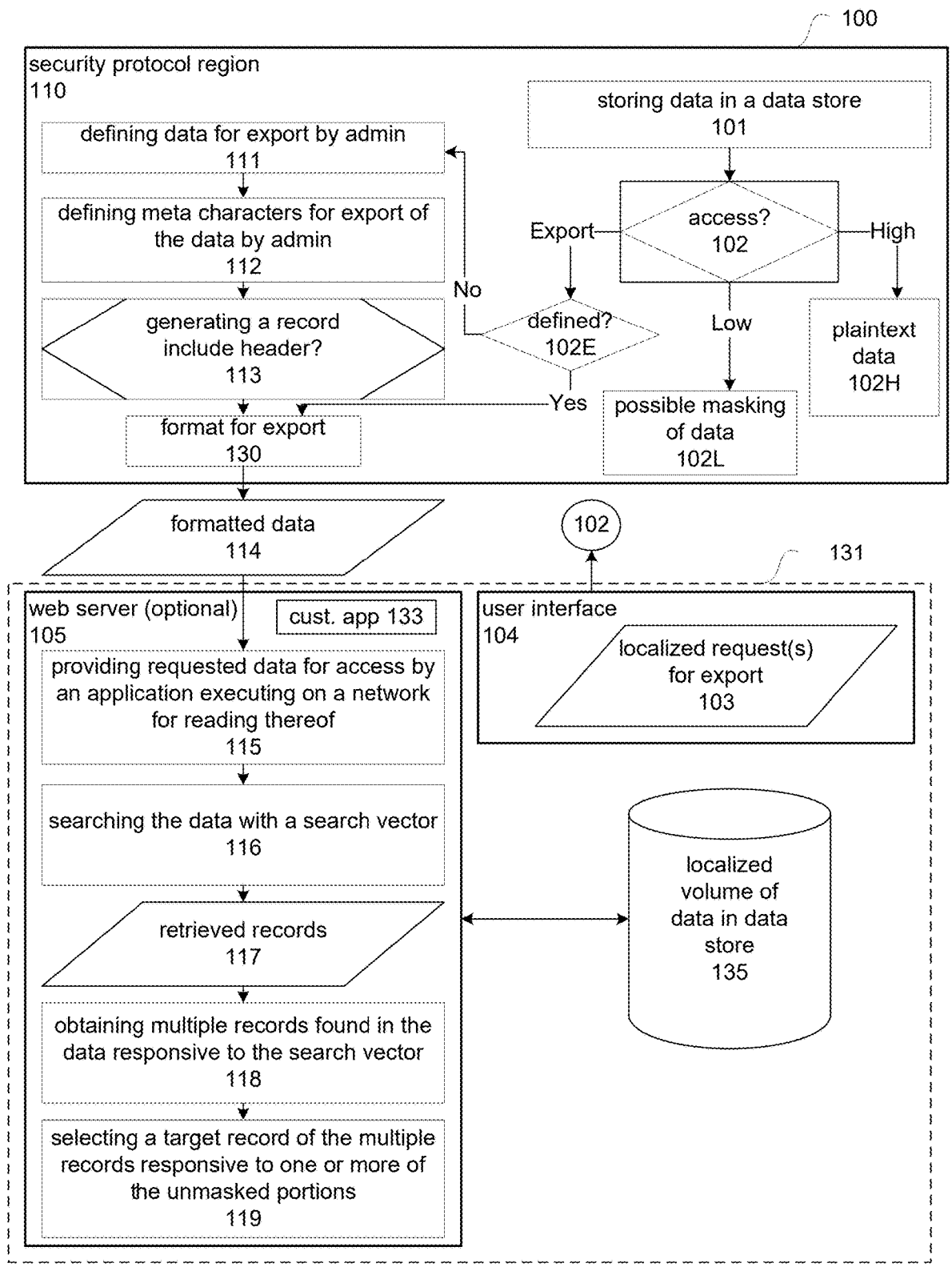
FIG. 1 is a block-flow diagram depicting an example of a data handling system in communication with a localized server.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

In large data sources, there may be many duplicates in names. The only way to discern which record is a correct target among such duplicates might be to compare personally identifiable information. However, sending personally identifiable information in the clear or displaying such information in the clear can be problematic. It is conventional practice to develop integrated applications with such secure data stores that control access to such secure data. Authentication and authorization protocols for the use of such an application, network encryption, as well as programmed display of search results, provides protection of personally identifiable information for direct access to such secure data stores.

As described below in additional detail, a proposed protocol provides similar security but for decoupled access, namely when such direct access is not available. To provide security while allowing an ability to delineate between duplicate records, data exported from secure locations may be masked but with an ability to perform local limited decryption for an ability to perform full data comparisons of selected portions on an as needed on demand basis. Various aspects of controlled release of information are described below in additional detail. With the above general understanding borne in mind, various configurations for systems, and methods therefor, for controlled release of information thereof are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a block-flow diagram depicting an example of a data handling system 100 in communication with a localized server 131. In another example multiple localized servers may be used. Data handling system 100 may include one or more server computers. Such one or more server computers may each include system memory, one or more processor units or cores, and a network interface. Furthermore, each of such one or more server computers may be in communication with one or more data stores, such as a data drive having data in a database for example. Generally, system memory may be configured to store program code including one or more data services. A network interface may be coupled for receiving user requests for such one or more data services. Examples of systems and networks that may be used for providing a data handling system 100 are described below in additional detail.

In response to executing program code, data handling system 100 may be configured to initiate operations for implementing a process for controlled release of information as a localized volume of data to one or more local servers for access by one or more user devices. To avoid doubt, such local server 131, which may be a standalone or networked computer or other electronic device consistent herewith, is in a separate network, including a separate security domain, from that of data handling system 100. Such controlled release of information may be substantial in volume where security from data handling system 100 to one or more user devices is not practicable. For purposes of clarity by way of example and not limitation, the State of California Department of Public Health ("DPH") maintains vital records for each county in the state. Direct access to the DPH database is available to DPH employees in their security protocol region. This allows them to do their work. However, county officials might like or need to have access to some of such DPH data. DPH administrators could access their system and export specific data on a user request-by-user request basis, but this is not practicable. As described below in additional detail, rather than servicing individual requests out of the DPH database, a substantial portion of the data specific to one county, such as a localized volume of such data in such DPH database, may be transferred to county offices in one transaction. A county may define the selection of data records, what personally identifiable information they wish to protect and a masking format to use for each data column or other orientation. This county localized volume of exported data could be maintained in the original file or imported into county databases. A county can provide their employees with a custom application that parses the formatted data in such localized volume. County administrators with a decryption password can use such a custom application to view the original data of any record. County employees without a decryption password can view masked data. This allows sensitive data to be protected in an ongoing manner while being locally used, unless a decryption password is exposed or misused. In short, vast quantities of data may be exported outside of a security protocol region of origin for use in localized external systems. Each such localized external system may access their local volume of data from one or more corresponding custom applications, which may vary from one to another in accordance with flexibilities described hereinbelow.

Along those lines, data handling system 100 may include a security protocol region 110. Security protocol region 110 may be an environment for access of data subject to one or more protocols. Security protocol region 110 may for example be an intranet or other private network having captive communication with a cloud-based server system. In another example, such intranet or other private network may be in communication with a cloud-based server system via an IPsec tunnel for example.

Figures 1, 2:
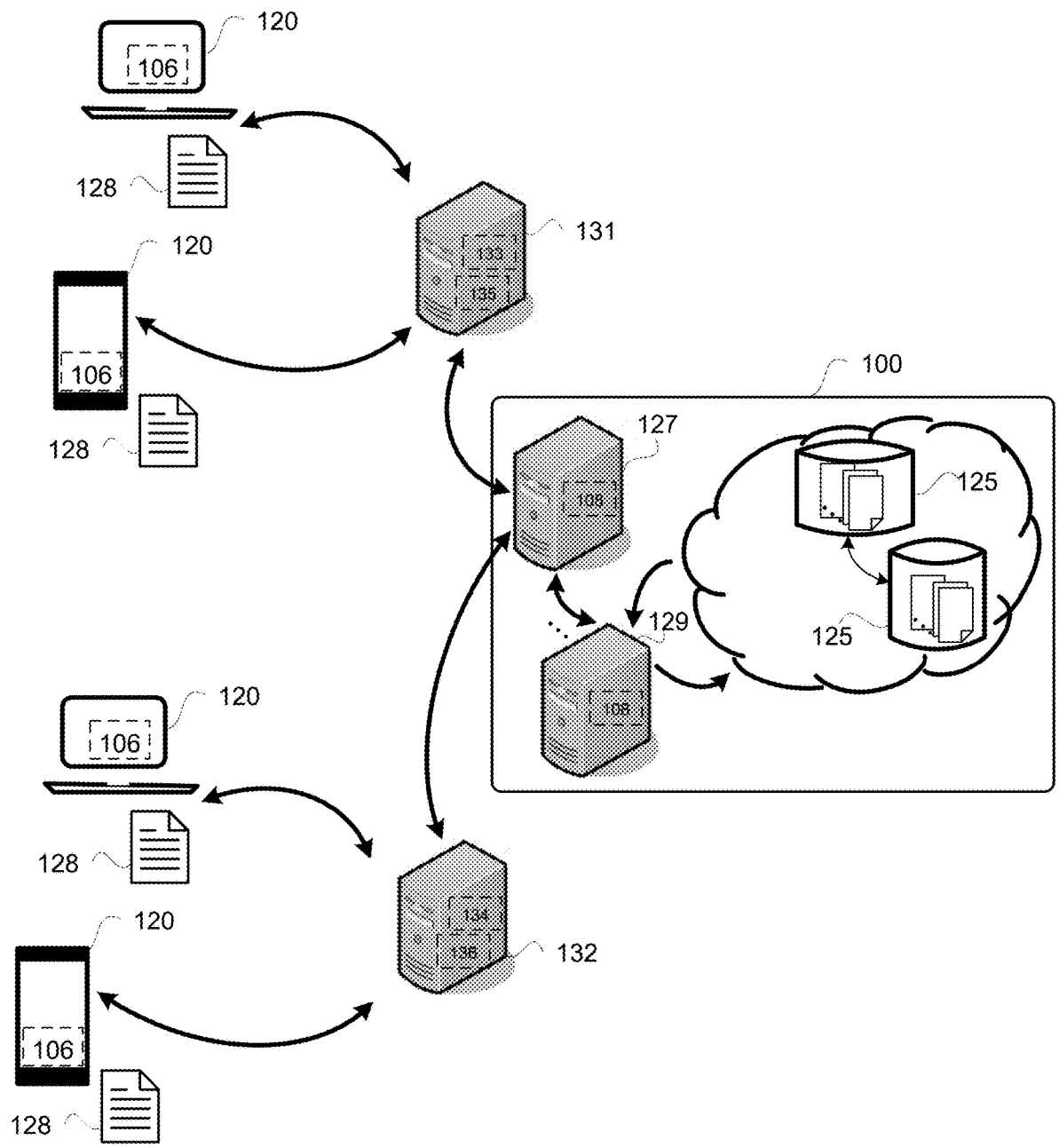
Figure 2:
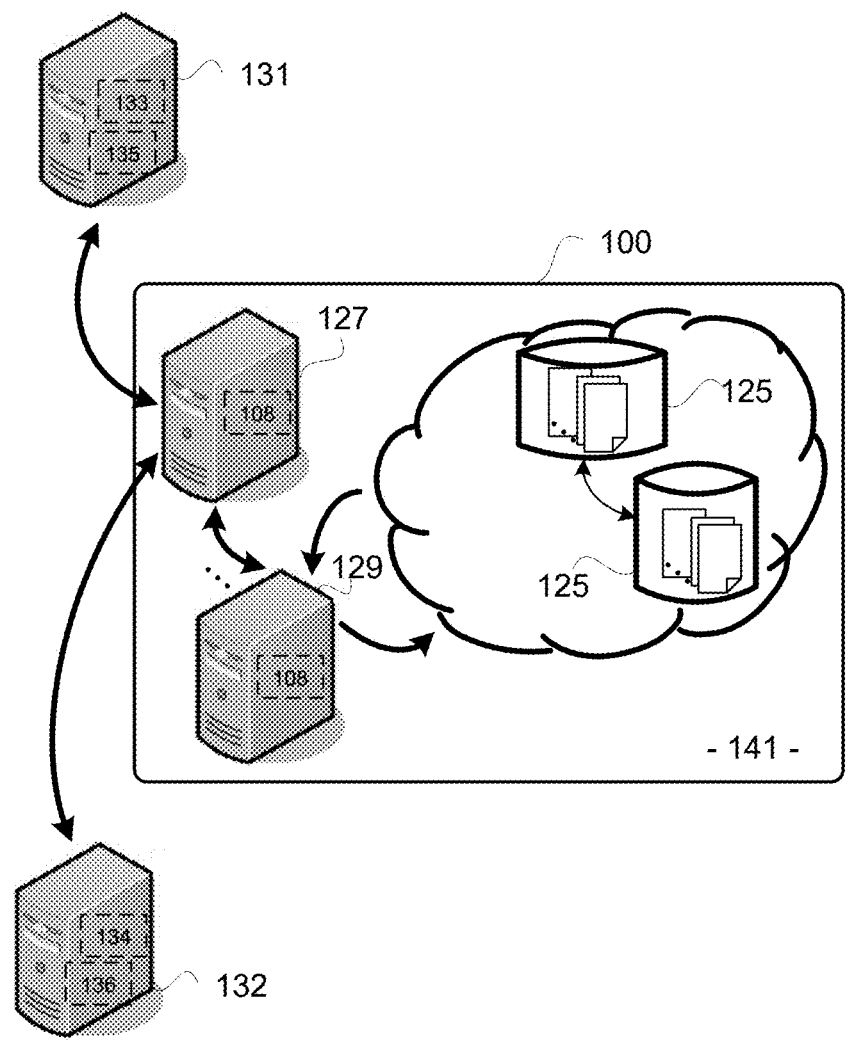
Figure 2:
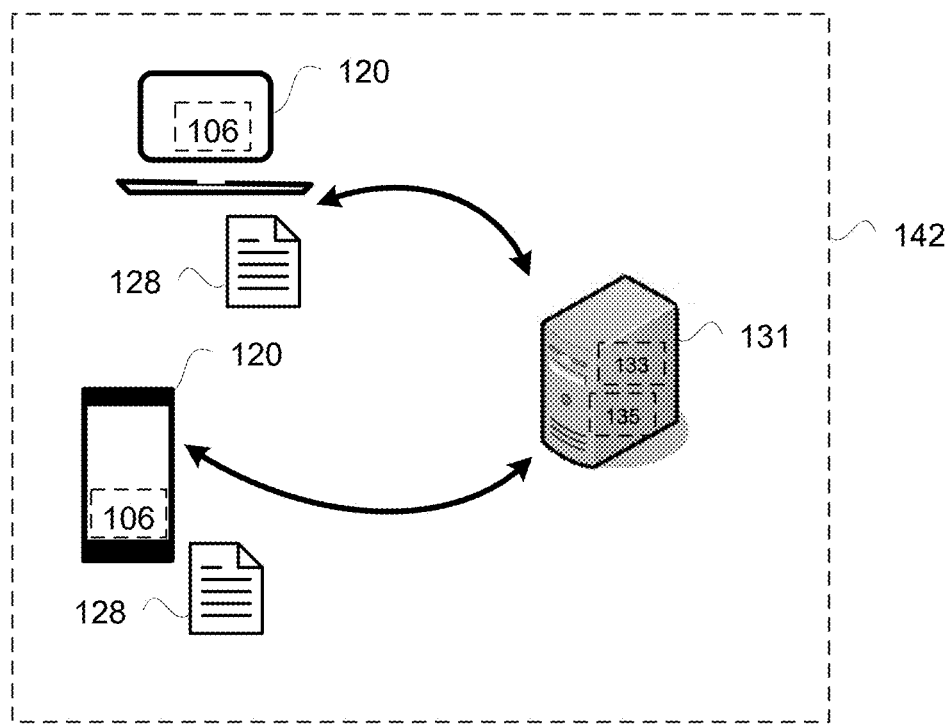
Figure 3:
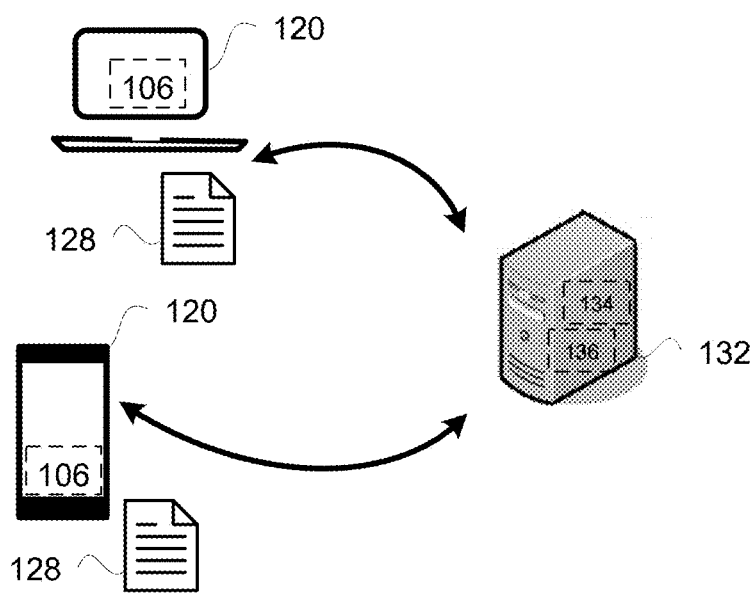
Figures 1, 3:
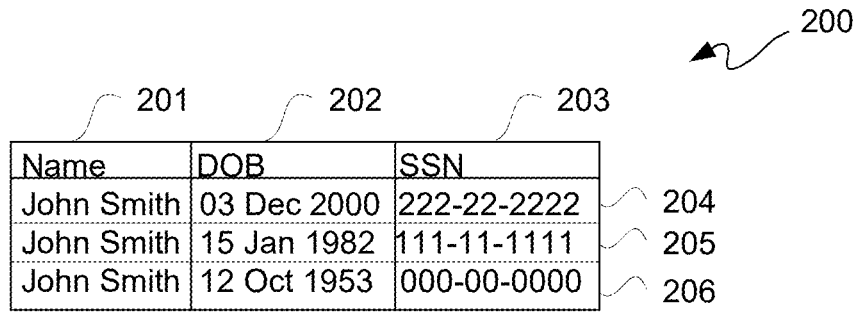
Figures 2, 3:
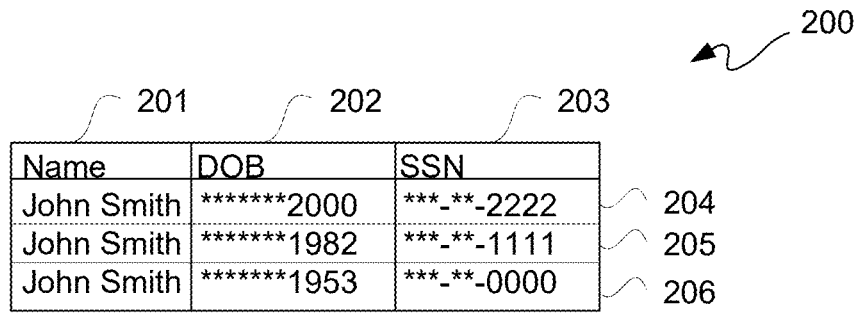
Figure 3:
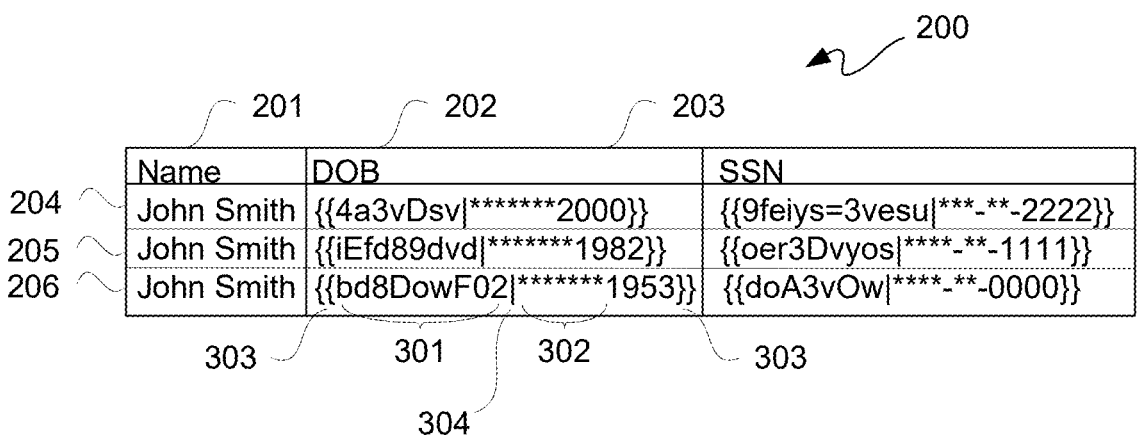

For purposes of clarity by way of example and not limitation, FIG. 2-1 is a pictorial-flow diagram depicting an example of a data handling system 100 in communication with localized servers 131 and 132 and localized servers 131 and 132 in communication with one or more local user devices 120. FIG. 2-2 is a pictorial-flow diagram depicting an example of data handling system 100 in communication with localized servers 131 and 132 for communication of a localized volume of data, and FIG. 2-3 is a pictorial-flow diagram depicting an example of localized servers 131 and 132 in communication with local devices 120 for access to a localized volume of data after export as depicted in FIG. 202. With simultaneous reference to FIGS. 1, 2-1, 2-2, and 2-3, systems and processes thereof are further described.

Local devices 120, such as smart phones, tablets, notebooks, or other computers, may be in communication with localized servers 131 and 132 via Internet or intranet communications for example. In this example, a notebook computer and a smart phone are illustratively depicted as user devices 120 in two-way communication with localized servers 131 and 132.

In this example, cloud-based data handling system 100 includes one or more server computers 129, each of which generally provide one or more processors of a CPU and system memory. Each server computer 129 may have multiple processors for CPU usage and multiple memories forming a system memory. Server computers 129 may be in networked communication with data storage, such as for example one or more data stores 125 in a network for storing electronic documents or other forms of data. Data stores 125 may be in communication with one another to form a cloud-based data cluster, as generally indicated. Data in data stores 125 may be encrypted, unencrypted, or a combination of these.

One or more server computers 129, as well as a web server 127, may include system memory with program code, generally indicated as program code 108 to provide a program product including one or more data services as described below in additional detail. System memory may be configured to store program code 108. Program code 108 may be for providing data services, as described below in additional detail. Similarly, localized servers 131 and 132 may be configured with program code 133 and 134, respectively, for having a localized or custom application or app, such as apps 135 and 136, respectively.

A web server 127, which may be in communication with one or more server computers 129 of data handling system 100, may be configured for network interfacing with localized servers, such as servers 131 and 132 in this example, and servers 131 and 132 may be for servicing local user devices, such as for example a smart phone or notebook computer 120. Web server 127 make likewise include program code 108 for providing data services, as described below in additional detail.

Even though program code 108 is generally indicated as being distributed among web server 127 and computer servers 129, such program code may reside mainly in web server 127 for controlling web server 127 operations, including exporting of data, as well as operations of one or more downstream devices, such as for example computer servers 129. Optionally, computer servers 129 may include a portion of program code 108 for controlling data stores 125. In another example, rather than using a web server 127, a localized volume of data may be loaded onto a portable storage device for hand delivery; however, for purposes of clarity by way of example the above example of multiple counties of in a State is used, where such counties have an ability to request a localized volume of data to such county from a State database.

Localized servers 131 and 132, with only localized server 131 illustratively depicted in FIG. 1 for purposes of clarity and not limitation, may be configured to provide an online request for a substantial amount of localized data, namely a localized volume of data. An online request 103 may be provided from a user interface 104 of localized server 131 to data handling system 100 in order to obtain a volume 135 of localized data for storing in or accessible by such localized server 131. For example, such a volume 135 may be used as a data store as received or may be incorporated into a database of or accessible by localized server 131.

User devices 120 may be programmed to provide requests for obtaining a data service, whether for electronic documents or data or both. For purposes of clarity by way of example and not limitation, it shall be assumed that requests are for data records in a database 135 of server 131 in which a localized volume has been incorporated; however, a localized volume 135 may be used as an accessible data store in another configuration. These requests, and responses thereto, may be communicated via one or more networks to server 131 for example.

It will be understood from the following description that any of a variety of configurations may be used for providing a data handling system 100 and one or more localized data servers 131 and 132 as described herein.

With simultaneous reference to FIGS. 1 and 2, data handling system 100 in communication with localized data servers 131 and 132 is further described.

At operation 101, data may be stored in one or more data stores 125 In an example, such data may be stored in an encrypted form in data handling system 100. In another example, data may be stored in a database with plain text columns. In yet another example, data may be stored in CSV files in plain text. Regardless, data is stored under a security protocol. Access within such a security protocol region uses secure access, such as for example HTTPS communication, network and folder permissions. The data may or may not be encrypted. If data is encrypted in a data store under an admin password, then a different password or key should be used for export of encrypted data to avoid exposure of an admin password or key.

At operation 102, access to a data store may be determined in response to a request, such as for example a request from a server 131 as a localized request 103 to obtain a localized volume or generally a substantial portion of data. In a security protocol environment for this example, there may be three different levels of access, namely a high- or an administrator-level security, a low- or user-level security and an export-level or a less secure access to data, which may be distinguished from different user or use permissions. In another example, another type of hierarchy for access to data may be used. Access to data may be distinguishable from permitted uses; however, control of access may be used to hierarchically impose at least some governor on data access to limit uses. For purposes of clarity by way of example and not limitation, it shall be assumed a configuration for administrative access and restrictive access is put in place. In this example, administrative access includes two behaviors or operations: (1) viewing underlying data directly if not encrypted, and, if encrypted, such as in a data store, decrypting such data upon retrieval; and (2) configuring a restricted access definition. A restricted access definition may include defining which one or more data item types, such as by columns for example, are nonsensitive and thus viewable as plaintext, and which one or more data item types are restricted by encryption and masking. A restricted access definition may include a masking format, and, if an underlying data store stores such restricted data in plaintext, including an encryption key for an encrypted/masked data column. Again, such encryption key or password should not be the same as that used for data store encryption of data, if such data is stored in an encrypted form. In contrast to administrative access, in this example restricted access may include two behaviors or operations: (1) viewing data as described below in "low-level" access where it is either plain-text or masked/encrypted based on a restricted access definition therefor; and (2) exporting data for localized access as described below for a "export-level" access. For avoidance of doubt, users with only restricted access might not be able to view original data or define how each data type, such as by column for example, is handled.

If at operation 102 it is determined that a high-level access request for security access user privilege is received, then at operation 102H a decrypting for reading within a secure environment, including security protocol region 110, may be performed without masking of any data. In other words, for high-level security access privileges, such data may be read in the clear. Again, such data might not be encrypted as stored in a data store, and so an admin may read plaintext data at 102H without having to perform a decryption.

If, however, at operation 102 it is determined that a low-level access request for security access user privilege is received, then at operation 102L a "partial" availability for reading within a secure environment, including security protocol region 110, may be performed to make available some data for reading with a remainder of such data being unavailable to such user. Along those lines, for example only a portion of a row of data may be made available to limit access or to tailor to a user application. This activity depends a priori on a prior configuration, as previously described, for restricting access to sensitive data while allowing access to nonsensitive data with respect to low-level access. In other words, for low-level security access privileges, a portion of data may be read in the clear and a remainder of such data may remain unavailable to such user based upon a prior configuration by an administrator. A high- or low-level access to data in an exported volume of data may be performed after export, but it should be understood that export of a volume of data from a back-end data store in a security protocol region is separate and distinguishable from individual access of data in such volume. For example, if only nonsensitive data is exported in a volume, then a hierarchical access to such volume of data at a remote site might not be a data equivalent to hierarchical access to a data store from which volume was sourced.

If, however, at operation 102 it is determined that an export-level access request is received, then at operation 102E such requested data may be formatted for export in a format for an export-level security access privilege based upon a prior configuration for restricted access. An export-level access is a less secure or trusted environment. Again, such data may or may not be encrypted. Nonprivileged information for example may be exported as plaintext, and sensitive information may be exported in an encrypted state. Moreover, some data may be restricted from export at all, namely made unavailable for export. In this example, all data requests 103 from a server, such as via a user interface 104 of a server 131, to an access operation 102 of data handling system 100 by default are an export-level security access privilege. In other words, in this example, no sensitive data is to be sent in the clear for export outside of a security protocol region 110. In an export-level security environment, there is no integrated access to a back-end data store 125 from a user application of a local server 131 or 132. This security decoupled ecosystem involves sending a volume of data for use by an external application associated with such local server. By sending some data as plaintext and sensitive data as encrypted, only a portion of data, such as a portion of a row, may need to be decrypted to limit access or to tailor to a user application. Such user application may be a third-party user, and so a same shared password used for export may be used such as for supporting external use of exported encrypted data. Furthermore, limiting the amount of data being decrypted can improve performance over decrypting each entire row of encrypted information for example.

A back-end data store 125 may be a database where original data resides. A server-user application may use a volume of data exported from such back-end data store formatted in a specific format, as described below in additional detail. Server 131 and associated user devices 120 may form a network, which is not a subnet of a network of data handling system 100, but rather is decoupled from a network of data handling system 100. In other words, after transfer of a file 114, there is no connection between operation of a network 141 of data handling system 100 and a network 142 of server 131 for example, as these networks are decoupled from one another after exporting of file 114.

In response to a request 103, requested data may be accessed from a data store 125 at operation 102 and a check for a previous defined form for export of data may be performed at operation 102E for export as a localized volume of data. Again, a web request 103 is for purposes of clarity by way of example and not limitation. For example a source of a request need not be a cloud-nor a web-based request external to a security protocol region, but may be a data handling system 100 internal request. If an admin has not previously defined a form for export of data as determined at 102E, then at operation 111, such formatted data may be defined or identified for export, for example identification of data columns to be exported. Exporting of retrieved data in such a form or format may include having unmasked (plaintext) portions, and/or the combination of masked portions and encrypted portions of such data. Examples are provided below for purposes of clarity and not limitation. Data in a back-end data store 125 is thus exported by a process within such back-end data store security environment, format of this export may be determined by a user who can select which data fields are privileged information and which are not subject to admin approval. Privileged information may be exported as described herein. Such export may be in a custom format designated by user and implemented by an admin of security protocol region 110 to include both original data in encrypted format and a custom mask version (based on data type). Along those lines, a user might request an admin of security protocol region 110 to define a format to include a header or other record for export of data. If a user, such as a third-party app developer, wants an admin to include a header to accompany exported data, then defining at operation 111 may include a settable flag to generate a header and may include format of such header. Such data may be exported or transferred to an external system, such as a local server 131 or 132 for example outside of a back-end data store secure environment in response to a request. Again, servers 131 and 132 could be standalone devices or separate networks.

At operation 112, meta characters may be defined by an admin for export of data. At operation 113, a record with a convention for meta characters may be provided or generated for traveling with such localized volume of data. For example, such a record may define a convention for use of meta characters in such formatted data in such volume in a format for export. At operation 113, it may further be determined whether an optional header is to accompany a volume of data 114 in an export format exported from data handling system 100 along with a record for meta characters therefor. If a header is to be generated as determined at operation 113, such as in response to setting a flag as previously described, then such a header may be generated at operation 113. For purposes of clarity by way of example and not limitation, it shall be assumed that a record with meta characters is provided with a header to accompany data formatted for export. This is just an option, and in another configuration such a header may be omitted.

At operation 130, data identified for export may be formatted in accordance with a currently defined format via operations 111 through 113 or a previously defined format as determined at 102E and obtained at 130 for formatting of requested data for export. After formatting at operation 130, such formatted data 114 with, or without, a header may be exported outside of a security protocol region 110, including real or virtual space thereof. Optionally, a header record or header may be sent with formatted data 114 to establish a meta character convention, which may be configured for an application, such as app 106, via an API.

A formatted volume data with a header 114 may be in a protected state. For example, privileged or sensitive information may be encrypted or otherwise formatted to protect personally identifiable information. Additionally, masking may be used to provide an indication of what information may be regarded as privileged or sensitive subject to restricted access. Thus, a delineation between access within a security protocol region and outside of security protocol region of a data handling system 100 may be understood. Integrated applications where a device with a specific application can access a back-end data store directly do not need to use processing as proposed herein because those applications have secure communication with a back-end data store to provide sufficient data protection as part of their integration. However, server 131 and 132 are each of a "security de-coupled" context or configuration, namely where secure communication is not possible or practicable between such local server 131 and data handling system 100.

Custom applications, such as app 133, can access an exported data file or volume of formatted data 114. A custom application 133 may provide different levels of access, such as high- and low-levels of access as previously described, but with respect to a localized server, such as server 131 for example, accessing a localized volume of data, such as data store 135 in which formatted data 114 may be stored after export. For example, localized high-level access by an administrator might decrypt encrypted values in individual privileged data fields of an exported data file or volume. One or all of such decrypted values of an individual record can then be viewed in their entirety. Localized medium- or normal-level access of a data store 135 by a regular user may display plaintext and masked values of exported data file or volume. Unauthorized access to the raw data in a file or record may then be limited to exposure of only the plaintext and masked values thereof. There may not be any localized low-level access. While all of the encrypted data could be decrypted and then exported in another configuration, this would pose a significant security risk.

If an optional web server 105 is used, then formatted data 114 may be passed from such web server 105 to data store 135 for storage and used as described below in additional detail. With a data store 135 populated with a localized volume of exported data, a custom app 133 may be used to access such data. In this example, such a custom app 133 uses a web server 105 for servicing user devices 120. In another implementation without a web server 105, custom app 133 may store formatted data 114 directly in data store 135; however, as a web server may increase performance over use of just a custom app, for purposes of clarity by way of example and not limitation, it shall be assumed that web server 105 is used and is in bidirectional communication with a data store 135 for storing a localized volume of formatted data 114. In response to each local user request, at operation 115 requested data may be provided as formatted via a web page of web server 105 for display on a user device 120. In this example, a custom application or app 133 for example operates or executes on a network, such as in a cloud or other virtual space, opens such web page for access for reading a clear text portion of such requested data 114 as formatted for export or reformatted by such custom app subject to meta characters as defined in a header.

Again, web server 105 is optional. In another implementation, exported data 114 may be directly consumed by custom app 133 without having a web server 105.

An app 106 may operate on a user device 120 outside of a security protocol of a security protocol region 110 to communicate with such custom app 133 for example. In other words, it may be assumed that such a user device 120 is compromised, and so any data displayed in the clear on such a device would necessarily need to be limited to nonsensitive data only in order to mitigate against a security breach. Along those lines, such formatted data 114 may have masked portions and encrypted portions for a protected state of information therein to limit access outside of a security protocol.

At operation 116, data store 135 data may be searched responsive to a search vector, which may be input by a user via app 106. For example, for data 114 exported through a public or private network to a server 131 for access by a user device 120, such data may be accessed although in a protected state. App 106 may be accessible by an individual using a user device 120, as in this example. However, in another example, app 106 may be accessible by an artificial intelligence application or AI via an application program interface or API for app 106. However, whether by an individual or an AI, data in data store 135 may be in a protected state.

In response to a search at operation 116, one or more records 117 may be retrieved for example. At operation 118, it is assumed that multiple records are found in data 114 responsive to a search vector input by a user, including possibly an AI app, via app 106. At operation 119, such a user may select a target record of such multiple records responsive to one or more of unmasked portions of retrieved data mixed in with masked portions and encrypted portions of such multiple records 117.

Again, current data management systems often export data for reporting and migration purposes. This data can be stored in databases, text files, and other proprietary file formats. Some of this data can include sensitive personal information such as dates of birth, social security numbers, bank account or credit card numbers, phone numbers, and other personally identifiable information.

However, records may have duplicate information making it difficult to ascertain a target record. In large data sources, there may be many duplicates in names. A way to discern which record is correct might be to compare personally identifiable information. For purposes of clarity by way of example and not limitation, FIGS. 3-1 through 3-3 are respective table diagrams depicting an example of multiple records of data at various levels of security access.

With reference to FIG. 3-1, a file or portion of a file 200, such as a CSV or other tabular file for example, may be displayed with sensitive data in the clear for a high-level security access. In this example, there are multiple records 204 through 206 displayed, with each record including a name, date of birth or DOB, and a social security number or SSN in corresponding columns 201 through 203. For this example, social security numbers and days of birth are considered sensitive information. Such sensitive information may be protected in-situ with secure access, such as for example database user accounts, permissions, physical file access restrictions, secure network folders, or encrypted computer data drives, among other protections, within security protocol region 110.

With reference to FIG. 3-2, a known practice to protect sensitive data is to mask such sensitive information by replacing characters with a placeholder character, such as an asterisk for example, and then only displaying a small subset of such characters such as the last four digits of a social security number. FIG. 3-2 is the same as FIG. 3-1, except for each of records 204 through 206 days of birth and the first 5 digits of each SSN have been masked with an asterisk for this example. FIG. 3-2 may be an example of a low-level security access for viewing within a security protocol region 110.

However, when exporting data from secure locations, masking such data can defeat an ability to perform full data comparisons when needed on an on demand basis. To support both masking for privacy as well as limited secure access both in scope and time, FIG. 3-3 depicts an example of an export data format, such as for operation 111 of FIG. 1 for example.

With simultaneous reference to FIGS. 1 through 3-3, FIG. 3-3 is further described. Formatted data in data store 135 in this example has personally identifiable information masked. Such formatted data in data store 135 further includes encrypted whole values as well as an appropriate mask values. In this example, exported data may have masked characters as well as corresponding encrypted portions. FIG. 3-3 illustratively depicts an example of data as it exists in an exported data store or localized volume. However, custom app 133 would not show both encrypted and masked values. By virtue of formatting, a custom app 133 can display just masked values to users, such as in the example of FIG. 3-2. However, administrators have an ability to use an application to decrypt underlying data to show original data.

For example, with reference to record 206 of FIG. 3-3, masked characters 302 mask personal information, which in this example is day of birth and the first 5 digits of an SSN. For example, encrypted data 301 of record 206 is for selective and time-limited decryption of such masked characters 302. Along those lines, for purposes of clarity by way of example and not limitation, after decryption a timer in program code may be initiated to resort back to an encrypted form of such data after a set time, assuming a user has authorization to perform such decryption, in a decrypted state. For example, an administrator with one or more appropriate decryption keys can decrypt and view one or more encrypted values. However, should an exported source file of formatted data in data store 135 be accessed inappropriately, encrypted values of such data hide original sensitive data and only show masked characters therefor. Along those lines, for purposes of clarity by way of example and not limitation, decrypted values might only be stored in application memory, and such application memory may automatically be purged after each change in viewing from one to another record or performing another search. Additionally, for example, a timer may be an additional trigger for purging application memory.

Format of data in data store 135 may have configurability per application, which convention may be included in a header as previously described. For example, app 133 may have, for each record field 202, three types of meta characters: wrapper characters 303, a divider character 304, and masking characters 302. Encrypted values 301 do not include any of these meta characters. Furthermore, meta characters are mutually exclusive from one another, in other words each meta character can only be in one of such three types selected from a wrapper type, a divider type, and a masking type. An ability to define these meta characters at export allows flexibility of encryption standards. Applications that display such data can be configured to implement meta characters by default or in response to a user selection. This flexibility in meta characters, including selection thereof, allows data exporters and custom application developers to form an agreement that works for their agreed exported data format, in contrast to a preordained structural or meta characters, such as in HTML for example, which has specific nonnegotiable markup characters.

In a general example of {{encrypted-data|****mask}}, double curly braces are used as wrapper characters 303. However, a wrapper type may be selected from one of four types of brackets consisting of parentheses, square brackets, curly brackets, and angle brackets. Such brackets may be used for delineating masked portions and encrypted portions from unmasked portions. In this example, a pipe is used as a divider character 304. However, a divider type may be selected from one of three types of dividers consisting of commas, semicolons, and vertical bars or pipes. Dividers are used as a separator character for delineating masked portions and encrypted portions from one another. Masked portions are provided by encrypting character strings and masking individual characters thereof. Encrypted values of character strings after encrypting thereof do not include any meta characters. Order of encrypted data and masked data may be defined by an admin at operation 112**. It may be desirable to have a masked value portion first since an application may default to displaying such a masked value to any or all authorized application users. In other words, it may be faster to read a string to a first pipe and then extract that value rather than read through encrypted data to such a first pipe and then extract masked data to the closing characters. However, other users might prefer working with encrypted data leading masked data. A custom application may use an optional meta character header to interpret this format, which of course makes it a required header, rather than an optional header in this example.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
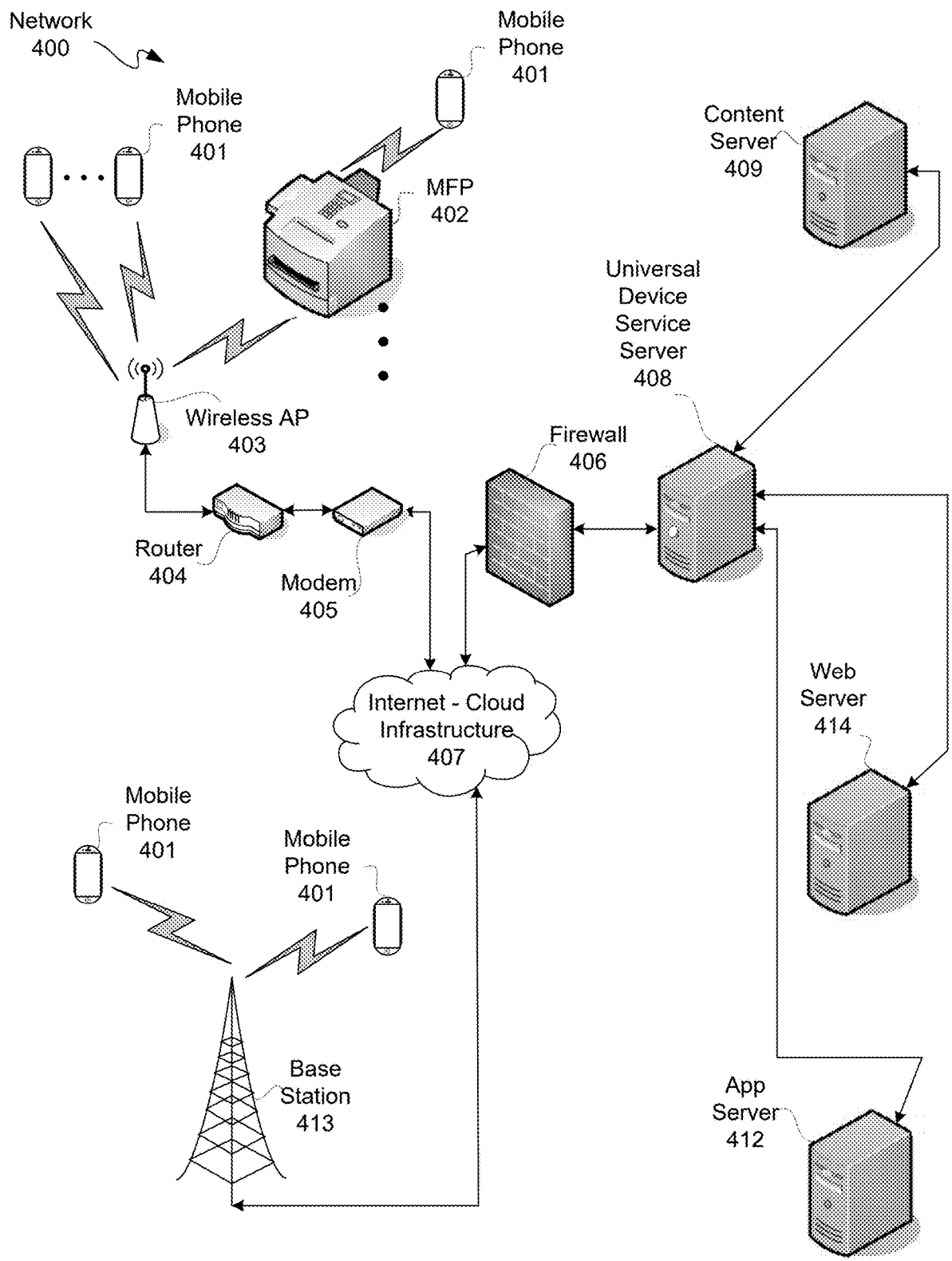
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
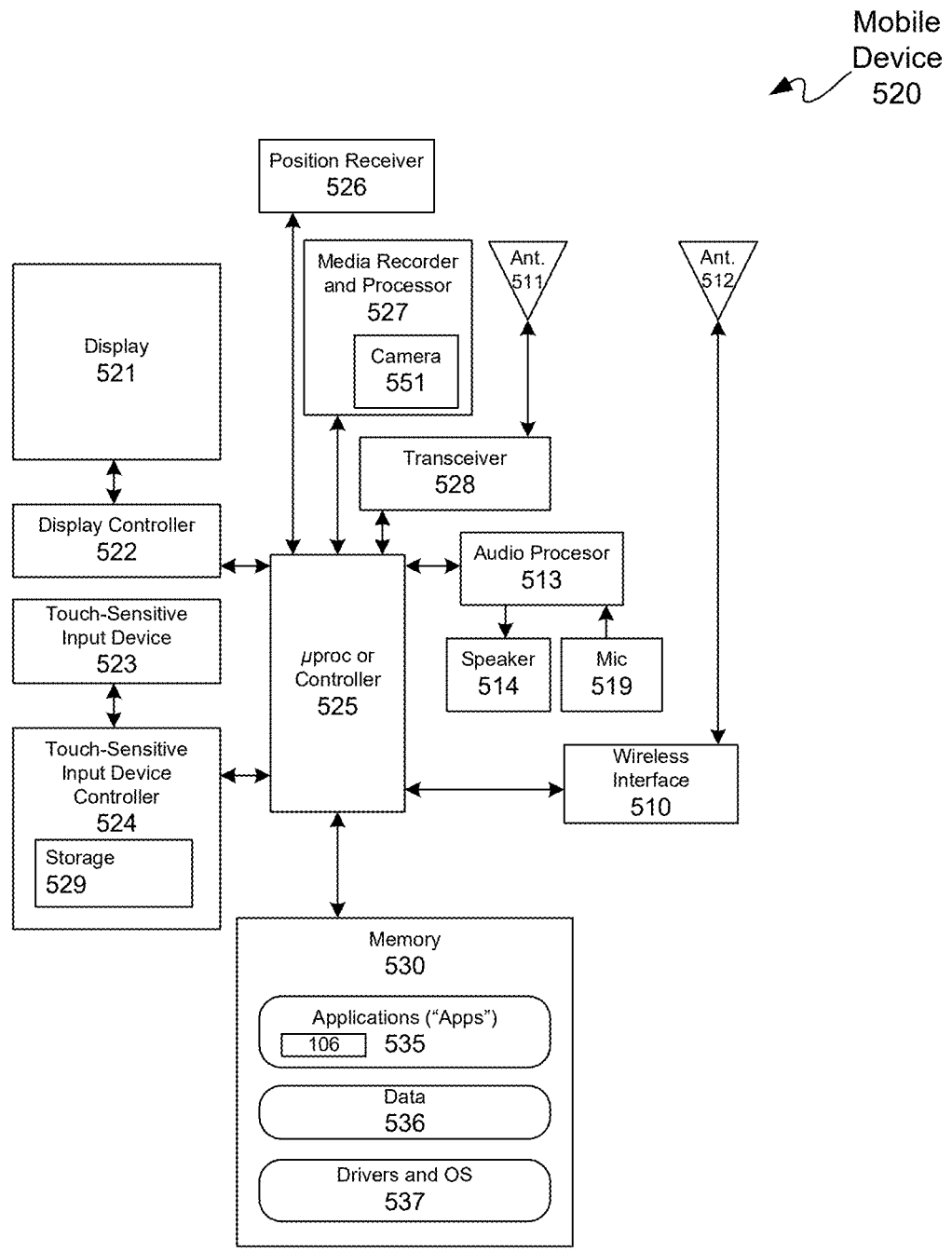
FIG. 5 is a block diagram depicting an example of a portable communication device.

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 106. Timing capability of mobile device 520 may be used to provide timing for timer programming of app 106. In another example, a printer driver may be included in drivers 537.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
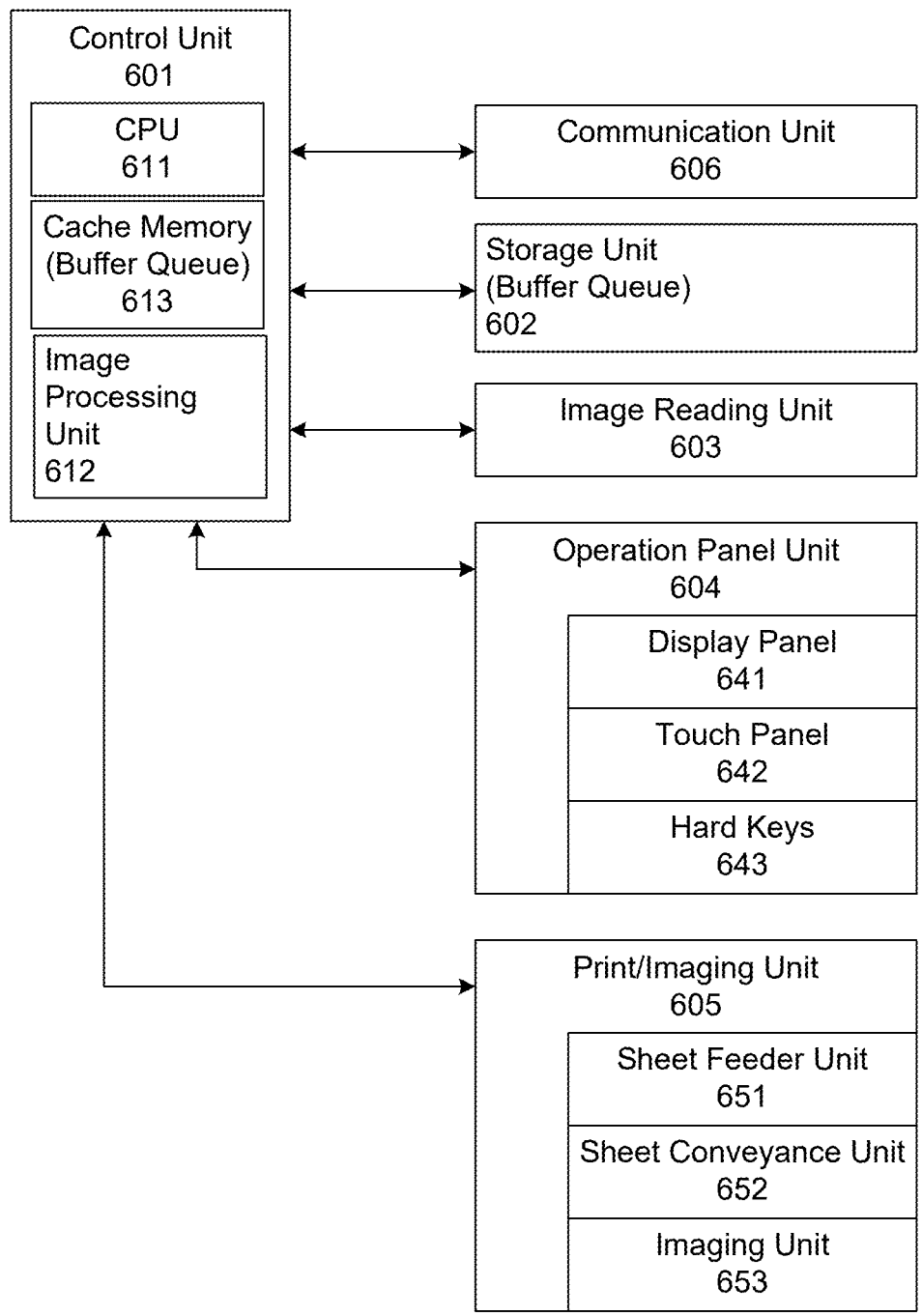
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
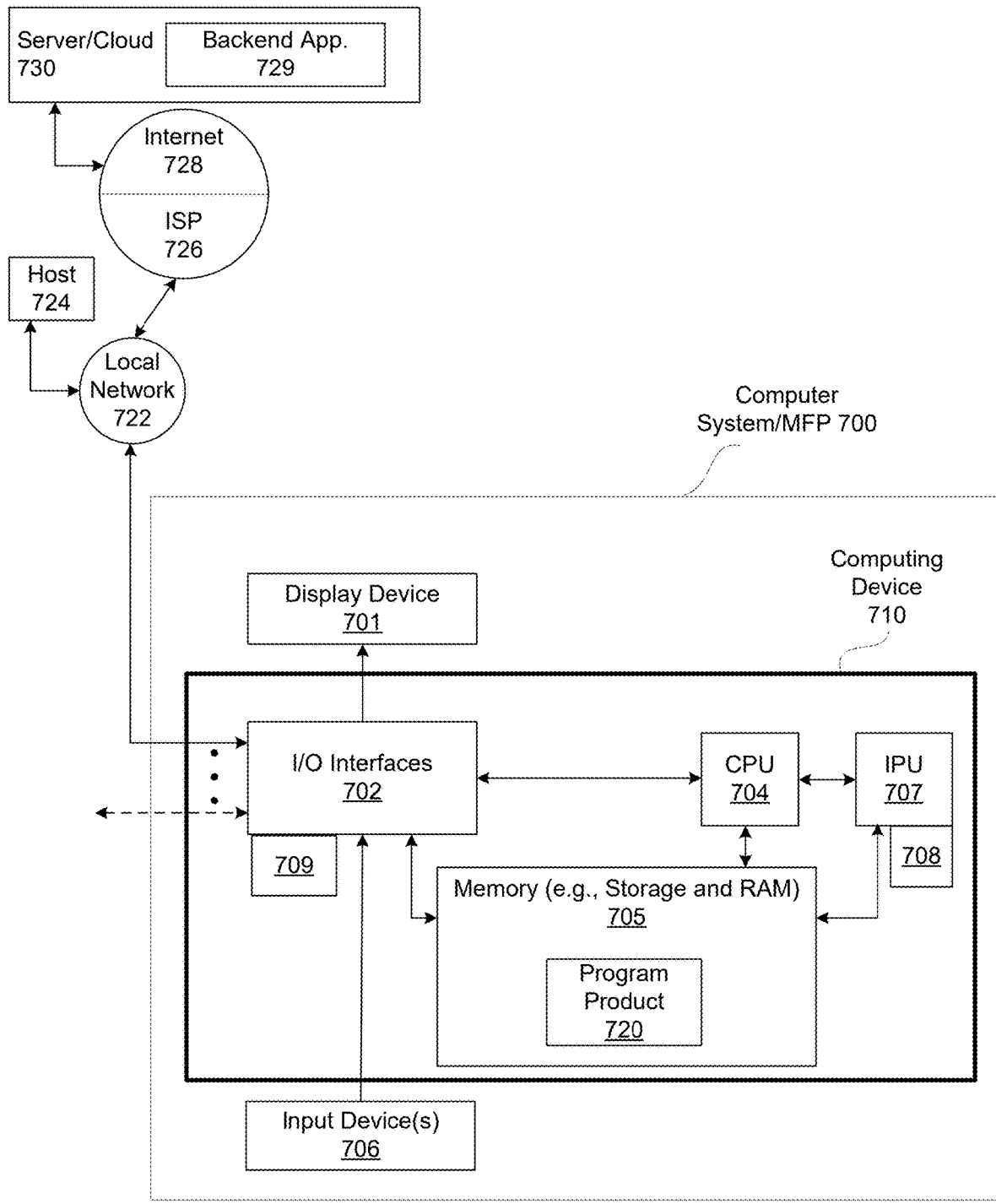
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories, including system memory, and one or more storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include an information and document handling manager for a programmed document server. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for controlled release of information, comprising:
    exporting data of a data store in a network in a format having unmasked portions, masked portions and encrypted portions of the data;
    wherein the data is exported as a localized volume outside of a security protocol of the network associated with restricted access of the data;
    providing the localized volume of the data for access via an application executing on a standalone device or a networked device for reading thereof outside of the security protocol by one or more local users;
    wherein the data has the masked portions and the encrypted portions for a protected state of the information to limit access;
    wherein the application is configured for localized access of the data in the localized volume;
    searching the data with a search vector via the application;
    obtaining multiple records found in the data responsive to the search vector; and
    selecting a target record of the multiple records responsive to one or more of the unmasked portions of the data mixed in with the masked portions and the encrypted portions of the multiple records.

2. The method according to claim 1, further comprising defining meta characters for export of the data from the data store for use by the application.

3. The method according to claim 2, further comprising:
    generating a record with a convention for the meta characters defined therein for traveling with the data; and
    exporting the record with the data.

4. The method according to claim 2, wherein each of the meta characters are in only one of three types selected from a wrapper type, a divider type, and a masking type.

5. The method according to claim 2, wherein the masked portions are provided by masking individual characters of at least one plain-text string with a masking pattern specific to accepted format of the data determined as part of an export definition in the record.

6. The method according to claim 2, further comprising encrypting character strings to provide encrypted values for the encrypted portions.

7. The method according to claim 4, wherein:
    the wrapper type is selected from one of four types of brackets consisting of parentheses, square brackets, curly brackets, and angle brackets; and
    the brackets are used for delineating the masked portions and the encrypted portions from unmasked portions.

8. The method according to claim 7, wherein:
    the divider type is selected from one of three types of dividers consisting of commas, semicolons, and vertical bars; and the dividers are used as a separator character for delineating the masked portions and the encrypted portions from one another.

9. The method according to claim 5, wherein:
the network is a first network;
the data is exported to a second network for the networked device;
the second network is outside of the security protocol and is decoupled from the first network after the exporting; and
the application is accessible by an artificial intelligence application via an application program interface.

10. The method according to claim 6, wherein the encrypted values do not include any of the meta characters defined for use by the application.

11. A system, comprising:
a data handling system with a system memory, a data store, one or more processor units, and a communication interface;
the system memory configured to store program code including data services;
the communication interface coupled for receiving user requests for the data services;
wherein, in response to executing the program code, the data handling system is configured to initiate operations for implementing a process for controlled release of information, the process including:
exporting data of the data store in a network in a format having unmasked portions, masked portions and encrypted portions of the data;
wherein the data is exported as a localized volume outside of a security protocol of the network associated with restricted access of the data;
providing the data as the localized volume for access by an application executing on a standalone device or a networked device for reading thereof outside of the security protocol by one or more users;
wherein the data has the masked portions and the encrypted portions for a protected state of the information to limit access;
searching the data with a search vector by the application;
wherein the application is configured for localized access of the data in the localized volume;
obtaining multiple records found in the data responsive to the search vector; and
selecting a target record of the multiple records responsive to one or more of the unmasked portions of the data mixed in with the masked portions and the encrypted portions of the multiple records.

12. The system according to claim 11, wherein the process further comprises defining meta characters for export of the data for use by the application.

13. The system according to claim 12, wherein the process further comprises:
generating a record with a convention for the meta characters defined therein for traveling with the data; and
exporting the record with the data.

14. The system according to claim 12, wherein each of the meta characters are in only one of three types selected from a wrapper type, a divider type, and a masking type.

15. The system according to claim 12, wherein the masked portions are provided by masking individual characters of at least one plain-text string with a masking pattern specific to an accepted format of the data determined as part of an export definition in the record.

16. The system according to claim 14, wherein:
the wrapper type is selected from one of four types of brackets consisting of parentheses, square brackets, curly brackets, and angle brackets; and
the brackets are used for delineating the masked portions and the encrypted portions from unmasked portions.

17. The system according to claim 16, wherein:
the divider type is selected from one of three types of dividers consisting of commas, semicolons, and vertical bars; and
the dividers are used as a separator character for delineating the masked portions and the encrypted portions from one another.

18. The system according to claim 15, wherein:
the data is exported to a publicly accessible network for the networked device; and
the application is accessible by an artificial intelligence program via an application program interface.

19. The system according to claim 15, further comprising encrypting character strings to provide encrypted values for the encrypted portions.

20. The system according to claim 19, wherein the encrypted values do not include any of the meta characters defined for use by the application.

* * * * *